Nov. 15, 1932. B. M. JENSEN Re. 18,655

BLOW-OUT PREVENTER

Original Filed Oct. 20, 1926

INVENTOR,
Bertel M. Jensen,
BY F. E. Maynard,
ATTORNEY.

Reissued Nov. 15, 1932

Re. 18,655

UNITED STATES PATENT OFFICE

BERTEL M. JENSEN, OF HUNTINGTON BEACH, CALIFORNIA, ASSIGNOR TO W. D. SHAFFER, OF BREA, CALIFORNIA

BLOW-OUT PREVENTER

Original No. 1,812,297, dated June 30, 1931, Serial No. 142,915, filed October 20, 1926. Application for reissue filed February 19, 1932. Serial No. 594,079½.

This invention relates to safety apparatus for oil well drilling equipment, and especially to a high pressure control gate adaptable to well casing particularly for the purpose of making an effective closure about an inner string of elements such, for instance, as a drill pipe extending down in the casing.

In the drilling of deep holes, it often happens that rather high pressures of liquid and gas are encountered, and such an event is attended with risk of injury or loss of equipment, property and life and as early as 1902 (Layne Patent 778,591) it was proposed to make a valve which included a pair of gate members to close together and to close about a central element. But the Layne valve was provided with rubber packing which was only effective around the embraced, inner element and no packing was provided as between the sliding gate parts and the gate casing and leakage was not precluded therepast.

Therefore, the broad object of this invention is to provide a safety control device including a packing means effective to cut off all sources of leak through the valve structure and thus form a reliable blow-out preventer. In other words, it is an object to provide a control gate device wherein not only is the through passage closed but also the operative gates are packed in the valve shell to close clearance crevices through the shell.

A further object is to provide a safety control gate device or blow-out preventer in which the packing between the gates and the valve shell is automatically expanded to close off the clearance crevices as the gate members move to a closing position.

An additional object is to provide a gate closing mechanism of few, effective and simple parts capable of rapid and reliable action.

The invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1:
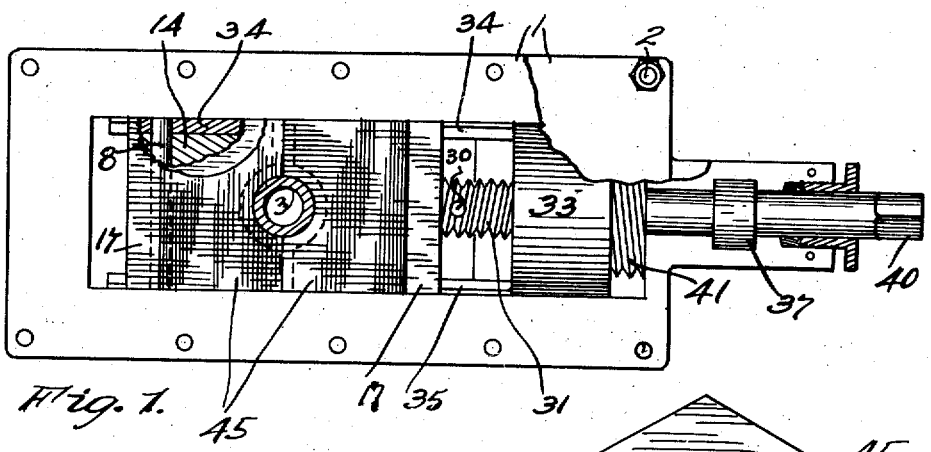
Figure 1 is a plan of the valve gates in the lower shell half; parts being broken away.
Figure 3:
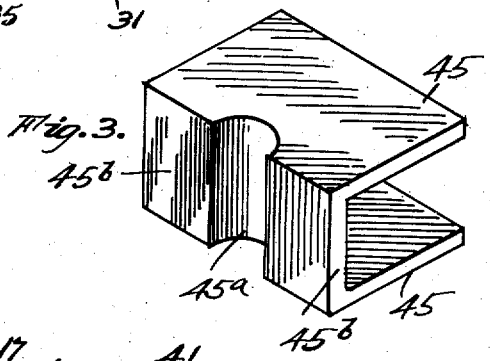
Figure 3 is a perspective of one of the rubber gaskets of a gate member.

The valve body or shell consists of matched, meeting-face top and bottom sections 1—1, suitably fastened together, as by a set of bolts 2. These sections have threads 6 to receive aligned casing ends 5—5 through which passes a pipe string 3, which may be a drill stem, with sections connected by collars or joints 4 which present shoulder ends. The shell 1—1 forms a transverse gate chamber in which there is mounted a pair of gates 13—14 which are simultaneously actuated by a suitable means, later described.

The inner, adjacent ends of the gates 13—14 have flat, transverse faces which are concaved from top to bottom to form a space for the through pipe 3.

An important feature of this blow-out preventer or control device resides in a packing means which not only effectively closes on the through pipe but also effectively seals the closed gate parts on their shell to prevent leak through the shell. This packing means includes laterally extending, upper and lower leaves 45 of rubber, rubberized fabric, leather, or any other suitable material and which respectively surround the through pipe 3 as a collar but also have a very large area of bearing and sealing contact with the adjacent smooth, interior, top and bottom surfaces 46—46 of the valve shell 1—1.

The upper leaves 45 are connected by a split, radially finned collar $45^a$ to the lower leaves 45; the collar $45^a$ lying in the recesses of the meeting faces of the gates 13—14 and the fins $45^b$ being on the diametrical faces of the gates. Thus when the gates are closed the collar seals on the pipe 3, the fins $45^b$ meet diametrically and the leaves pack against the faces 46—46 so that there is a double shell seal all around the hole through which the pipe 3 passes; one seal at top and one at bottom of the gate.

In order to produce a substantial pressure of the leaves on the faces 46—46 the gates 13—14 each are made with upper and lower members or shims 17—18 which are overlapped by the wide packing leaves 45 of the collar 45[a]. The inner faces of the shims 17—18 have bevel faced recesses which are complementary to bevel or cam faces C on the top and bottom faces of the gate bodies. These cams are designed to thrust the shims outwardly as the gates close together and on the through pipe 3 so that the packing leaves seat firmly on the opposed large, flat area of faces 46 all around the casing hole through the shell 1—1 both at top and bottom thereof. This, with the closed collar 45[a] and abutted fins 45[b] thus making a perfect and complete shut-off through the shell; an accomplishment not heretofore available in well casing valves of this type.

Figure 2:
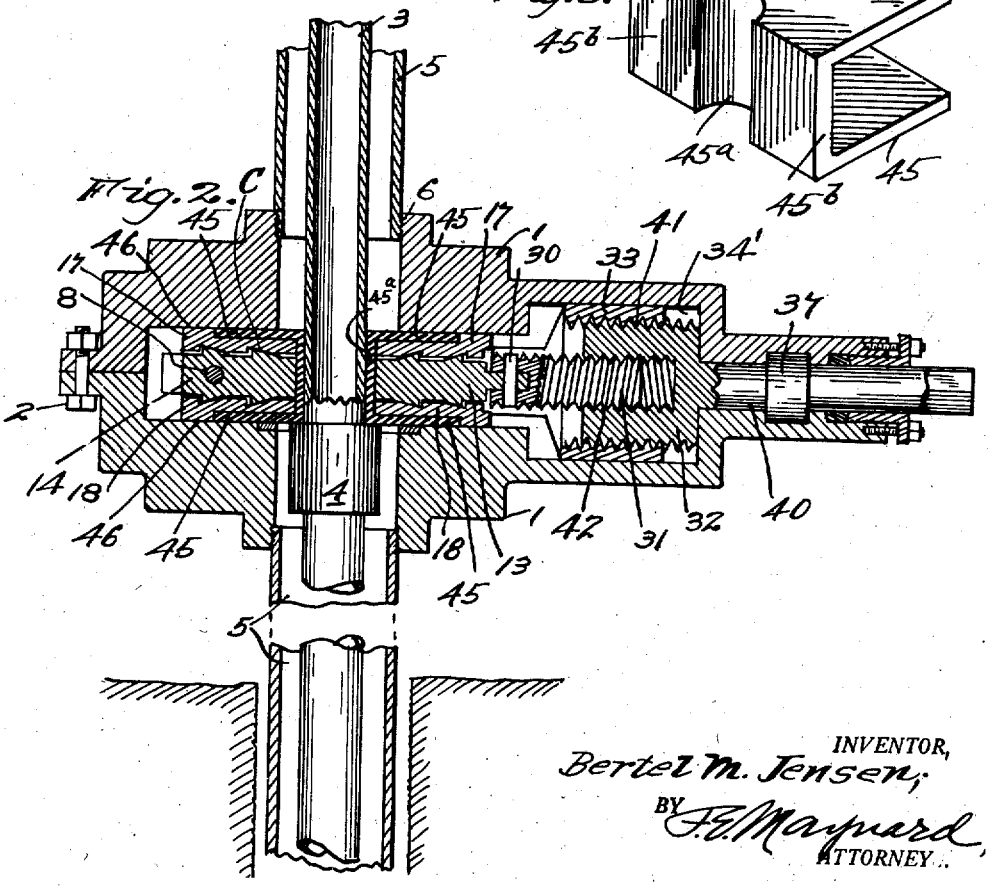
Figure 2 is an axial section of the device as applied to a well casing and with its gates in closed position embracing a through pipe.

It will be observed that the collar 4 of the pipe 3 can bear against the closed valve gates when these are in closed position, and by reason of engagement with the packing material, Fig. 2, will increase the sealing effect of the closed valve. The closed gates act as a lock engaging the pipe collar 4 to hold back the string in case of blow-out pressure high enough to force the string 3 upward. Suitable means to concurrently actuate the gates is provided and as here shown the gate 13 is connected by a pin 30 to a stem 31 threaded into a socket 32 which is threaded into a sleeve 33 axially sliding in a lateral chamber 34′ of the shell 1—1.

The sleeve 33 has a set of spaced arms 34—35 and these extend to the opposite end of the shell 1—1 and are secured to the gate 14, as by a pin 8. The sleeve 33 has an axial shaft 40 journaled in the shell structure and provided with a peripheral shoulder 37 recessed in the journal so as to preclude end motion of the shaft and its enlarged sleeve head 32. The outer end of the shaft is adapted for application of a suitable device for applying a turning effort, in either direction, to the shaft and therefore to the sleeve or head 32.

It is desirable to cause the gates 13—14 to simultaneously, relatively move in opposite directions when the shaft 40 is turned and for this purpose the outside threads 41 and the bore threads 42 of the sleeve head 32 are of relatively reverse pitch, that is, one is right-hand and one is left-hand, though both are of equal helical pitch. Therefore, as the shaft 40 is turned in one direction the two gates 13—14 will concurrently recede from closed position, or conversely will move coevally in closing action.

A very great advantage of this motivating system for the gates is that it is gearless and extremely simple, most noticeably compact, and particularly protected since the entire mechanism is housed in the gate shell 1—1.

Utility and operation are thought clearly disclosed in the above description.

What is claimed is:

1. A safety gate valve, for preventing blow-outs in high pressure wells, including a shell inclosing oppositely disposed gates provided with packing means covering their adjacent faces; said packing means having lateral leaves on the top and the bottom of the gates and seating on adjacent faces in the shell.

2. A safety gate valve, for preventing blow-outs in wells, including a shell with a through hole, a pair of oppositely disposed gates guided in the shell, and packing means covering the adjacent faces of said gates and having top and bottom parts lying between the gates and their shell bearing faces and forming complete seals around the said hole when the gates are closed.

3. A safety gate valve for controlling flow in well equipment, including a shell with a through hole and having spaced internal bearing faces, opposite gates operative between said faces to close off flow, and packing means between said faces and said gates and forming complete seals, when closed, around said hole; said packing covering the adjacent, closing faces of said gates.

4. A valve having a gate moving sidewise, guide faces between which said gate is movable, and packing covering the closing end of the gate and laterally overlapping the top and bottom of the gate and bearing on said faces to form a seal thereon.

5. A valve having a pair of opposed gates, guide faces between which the gates are mounted, and packing covering the closing faces of the gates and overlapping the top and bottom of each gate and bearing on said guide faces to form a seal thereon when the gates are closed.

6. A valve having a shell with a through flow hole, a chamber having plane spaced faces, and opposite gates with closing faces each covered with a layer of packing which extends over the faces of the gates which are adjacent to the said plane faces.

7. A valve having a shell with a through flow hole, a chamber having plane spaced faces, and opposite gates with closing faces each covered with a layer of packing which extends over the faces of the gates which are adjacent to the said plane faces; the extended portions of the packing being expansible against the plane faces.

8. A gate valve comprising oppositely disposed gates operative to open or to close said valve, and means for reciprocating said gates; said gates having their closing faces covered with a layer of packing which extends over top and bottom faces of the gates and forms complete upper and lower packing annulus when the gates are closed.

9. A valve having a shell having a flow hole which is surrounded by plane faces of the valve chamber, and opposite gates working in said chamber and having top and bottom faces overlapped by layers of packing lying against said faces and which are cooperative to form complete packing seals around the hole when the gates are closed.

10. A valve having a shell having a flow hole which is surrounded by plane faces of the valve chamber, and opposite gates working in said chamber and having top and bottom faces overlapped by layers of packing lying against said faces and which are cooperative to form complete packing seals around the hole when the gates are closed; said packing covering respective closing faces of the gates and meeting in sealing relation.

11. A valve having a shell having a flow hole which is surrounded by plane faces of the valve chamber, and opposite gates working in said chamber and having layers of packing lying against said faces and which are cooperative to form complete packing seals around the hole when the gates are closed; said packing layers being expanded by closing action of the opposed gates.

12. A valve having a shell having a flow hole which is surrounded by plane faces of the valve chamber, and opposite gates working in said chamber and having layers of packing lying against said faces and which are cooperative to form complete packing seals around the hole when the gates are closed; and means for effecting an expansion of said packing against the said faces as the gates are closed.

13. A valve having a shell having a flow hole and a gate chamber, opposed gates in said chamber having packing layers against adjacent faces of the chamber and covering the closing faces of the gates, said gates having means for expanding the layers against the said chamber faces.

14. A valve having a shell having a flow hole and a gate chamber, opposed gates in said chamber having packing layers against adjacent faces of the chamber and covering the closing faces of the gates, said gates having means for expanding the layers against the said chamber faces; and means for concurrently actuating the gates in opposite directions.

15. A gate valve structure including a shell and opposed gates therein, concentric, coaxial screw members connected to respective gates, and means for effecting concurrent, reverse axial motion of the screw members to shift the gates.

16. A gate valve structure including a set of opposed gates, and means operatively connecting the gates and including a rotative member having concentric right pitch and left pitch threaded portions, and complementary concentric elements engaging said threaded portions and connected to respective gates.

17. A gate valve structure including a pair of opposed gates, a rotative shaft on the longitudinal axis of the gates having right and left threads, and means connecting the gates respectively to the said threads so that the gates are concurrently actuated by said shaft said valve structure presenting an uninterrupted through hole when the gates are open.

18. A gate valve shell having a through flow hole and a gate chamber with surfaces surrounding said hole, and opposed gates working in said chamber and provided with packing to close together entirely around said hole and to expand against said surfaces and seal against leak thereby to said hole; the closing faces of said gates being covered by said packing.

19. A gate valve shell having a through flow hole and a gate chamber with surfaces surrounding said hole, and opposed gates working in said chamber and provided with packing to close together entirely around said hole and to expand against said surfaces and seal against leak thereby to said hole; the closing faces of said gates being covered by said packing and having recesses to receive a through object in the valve hole.

20. A gate valve shell having a through flow hole and a gate valve chamber with surfaces surrounding said hole, and opposed gates working in said chamber and provided with top and bottom laps of packing to close together entirely around said hole and to expand against said surfaces; the packing of each gate extending across its closing face to make a joint seal between the closed gates.

In testimony whereof, I have set my hand.

BERTEL M. JENSEN.